Sept. 22, 1959  A. E. OLSON ET AL  2,905,291
CLUTCH ASSEMBLY
Filed May 7, 1958
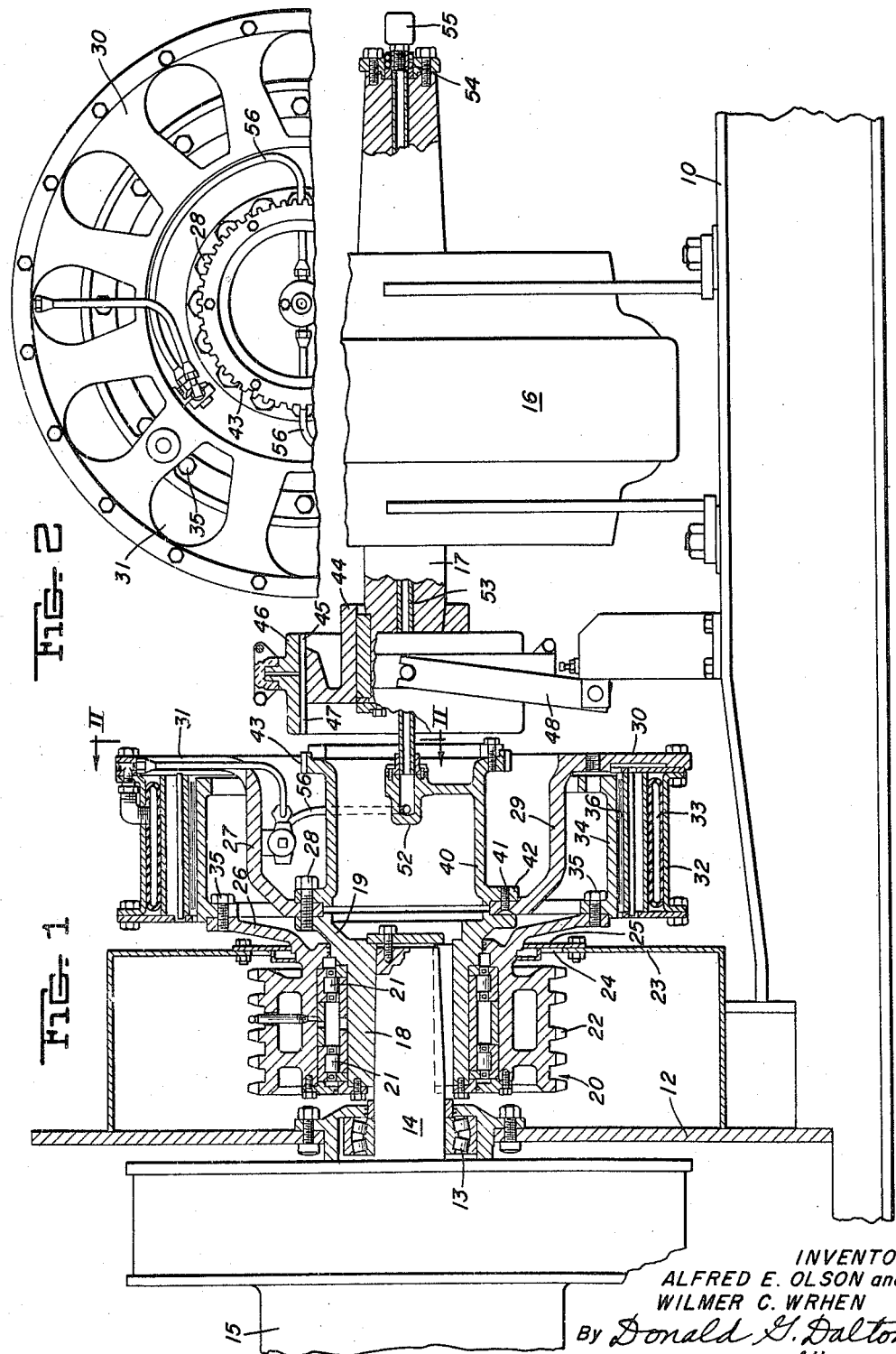
INVENTORS
ALFRED E. OLSON and
WILMER C. WRHEN
By Donald G. Dalton
Attorney United States Patent Office 2,905,291
Patented Sept. 22, 1959

2,905,291

CLUTCH ASSEMBLY

Alfred E. Olson, Dallas, Tex., and Wilmer C. Wrhen, Oil City, Pa., assignors to United States Steel Corporation, a corporation of New Jersey Application May 7, 1958, Serial No. 733,635

2 Claims. (Cl. 192—12)

This invention relates to a drawworks and more particularly to an improved assembly for connecting a hydraulic brake to the end of a drawworks drumshaft.

Our invention is an improvement over the assembly shown in Keim Patent No. 2,507,256, dated May 9, 1950, and of common ownership. The Keim patent shows a drawworks in which parts associated with the drumshaft (e.g. pneumatic clutches, sprockets, oil seals, etc.) are constructed to facilitate their removal and re-assembling with a minimum of disturbance of other parts. Nevertheless, when the drawworks is equipped with a hydraulic brake aligned with the drumshaft, this brake must be removed before other parts at the same end of the drumshaft can be removed. A hydraulic brake weighs several thousand pounds and its shaft must be aligned accurately with the drumshaft. Consequently removal and replacement of the brake are costly and time consuming operations.

An object of the present invention is to provide an improved assembly which connects a hydraulic brake to the end of a drumshaft and enables parts to be removed from this end of the drumshaft and re-assembled while the brake remains in place without upsetting its alignment.

A further object is to provide an improved assembly of the foregoing type in which a spacer is inserted between the confronting ends of the drumshaft and hydraulic brake shaft, said spacer being removable while both shafts remain in place.

In accomplishing these and other objects of the invention, we have provided improved details of structure, a preferred form of which is shown in the accompanying drawing, in which:

Figure 1 is a fragmentary elevational view, partly in section, of a portion of a drumshaft, hydraulic brake shaft, and associated parts, in which the connection between shafts is in accordance with our invention; and Figure 2 is a fragmentary vertical cross-sectional view on line II—II of Figure 1.

The drawing shows a portion of a drawworks which includes a skid or base 10, an upstanding plate 12 fixed to said skid, a bearing 13 supported by said plate, a drumshaft 14 journaled in said bearing and a hoist drum 15 keyed to the drumshaft. The structure at the other end of the drumshaft and details of the drum itself can be similar to the showing of the Keim patent, and hence their showing is not repeated. A conventional hydraulic brake 16 is fixed to the skid 10 and has a shaft 17 axially aligned with drumshaft 14 but spaced endwise therefrom in accordance with our invention.

A hub 18 is keyed to the end portion of the drumshaft outside the bearing 13, and carries an integral flange 19 projecting outwardly from its end. A driven sprocket 20 is journaled to the outside of the hub on bearings 21. Preferably this sprocket is double and carries a set of teeth 22 for driving a rotary countershaft, not shown. The mechanism for driving the sprocket likewise is not shown, since it can be of any conventional type. A guard 23 is mounted over the sprocket and has an opening 24 of sufficient size to permit the sprocket to be inserted and removed therethrough. A split cover 25 normally surrounds the sprocket and closes the opening 24, similar to corresponding parts in the Keim patent. Externally of guard 23 the sprocket carries an integral flange 26 extending outwardly therefrom.

In accordance with our invention, the outer faces of flanges 19 and 26 lie in approximately the same vertical plane spaced only slightly outwardly of the outer end of drumshaft 14 and a substantial distance inwardly of the inner end of the brake shaft 17. The driving and driven elements of a clutch are detachably fixed with respect to sprocket 20 and drumshaft 14. The driven element includes a rim 27 fixed to the outer face of flange 19 with removable capscrews 28. The rim has a cylindrical portion 29 and an integral flange 30 which contains openings or windows 31. A clutch housing 32 is fixed to the periphery of flange 30 and carries a pneumatic clutch bag 33. The driving element includes a drum 34 fixed to the outer face of flange 26 with removable capscrews 35 which are accessible through the windows 31 in flange 30. The inner face of the clutch bag 33 carries a clutch facing 36 cooperable with drum 34 to establish a driving connection between sprocket 20 and drumshaft 14 when the bag is inflated. Otherwise the sprocket and drumshaft can turn freely with respect to each other.

A spacer sleeve 40 is attached to rim 27 with screws 41. This spacer has an integral flange 42 at its inner end which contains openings for these screws and also for the capscrews 28. The outer end of the spacer terminates short of the inner end of the brake shaft 17 and carries external spline clutch teeth 43. A hub 44 is keyed to the inner end of the brake shaft and carries external spline clutch teeth 45. A clutch housing 46 is mounted for axial movement on hub 44 and has internal spline clutch teeth 47 which engage teeth 45 on the hub. An operating lever 48 is pivoted to the skid 10 and to the clutch housing 46 for shifting the housing between positions in which its teeth 47 engage or disengage teeth 43 on the spacer 40. Lever 48 can be motivated by any suitable conventional means, not shown. When teeth 47 engage teeth 43, the clutch of course establishes a driving connection between the hoist drum 15 and the hydraulic brake 16. When these teeth disengage, the clutch housing is clear of the spacer 40 and rim 27. The spacer also contains an integral internal hub 52. An air inlet tube 53 extends through an axial bore in the brake shaft, being supported on bearings 54 which permit relative rotation. The outer end of tube 53 is connected to a stuffing box 55 and the inner end is detachably connected to the hub 52. An air conduit 56 extends from the hub 52 to the clutch bag 33.

When the parts are to be dismantled, the air inlet tube 53 is detached from hub 52 and the capscrews 28 and 35 are removed. Thereupon the rim 27, clutch drum 34 and spacer 40 can be lifted out as a unit and further dismantled if desired. The split cover 25 can be removed and the sprocket 20 withdrawn through the opening 24 in the guard 23. The parts can be re-assembled in the reverse order. All these operations are accomplished without in any way disturbing the hydraulic brake 16.

While we have shown and described only a single embodiment of the invention, it is apparent that modifications may arise. Therefore, we do not wish to be limited to the disclosure set forth but only by the scope of the appended claims.

We claim:

1. In a drawworks which includes a rotatable drumshaft, drive means for said drumshaft journaled on an end portion thereof, driving and driven pneumatic clutch elements detachably fixed with respect to said drive means and said drumshaft respectively for establishing a driving connection therebetween and extending beyond the end of said drumshaft, and a hydraulic brake having a rotatable brake shaft aligned with said drumshaft but spaced endwise therefrom, the combination therewith of an assembly for connecting said drumshaft and said brake shaft comprising a spacer detachably fixed with respect to said drumshaft and lying within said clutch elements and having its end spaced from the inner end of said brake shaft, a clutch for establishing a driving connection between said spacer and said brake shaft, and conduit means extending through said brake shaft and detachably connected to said spacer and thence to said driven clutch element for introducing air thereto, said driving and driven clutch elements and said spacer being removable after detachment of said conduit means from said spacer while said drumshaft and said brake shaft remain in place.

2. In a drawworks which includes a rotatable drumshaft, a flange fixed with respect to said drumshaft, and extending beyond the end thereof, a sprocket for driving said drumshaft journaled on the end portion thereof, a flange fixed with respect to said sprocket and extending beyond the end of said drumshaft, driven and driving clutch elements detachably fastened to the respective flanges for establishing a driving connection between said sprocket and said drumshaft, and a hydraulic brake having a rotatable brake shaft aligned with said drumshaft but spaced endwise therefrom, the combination therewith of an assembly for connecting said drumshaft and said brake shaft comprising a spacer detachably fixed with respect to said drumshaft and said driven clutch element and lying within said clutch elements and having its end spaced from the inner end of said brake shaft, and a clutch mounted on said brake shaft for establishing a driving connection with said spacer, the fastenings between said flanges and said driven and driving clutch elements being located in planes adjacent the end of said drumshaft and more remote from the brake shaft enabling said clutch elements and said spacer to be removed while said drumshaft and said brake shaft remain in place.

References Cited in the file of this patent

UNITED STATES PATENTS

| | | |
|---|---|---|
| 2,351,851 | Young | June 20, 1944 |
| 2,507,256 | Keim | May 9, 1950 |
| 2,536,483 | Young | Jan. 2, 1951 |